(12) United States Patent
Pace, III

(10) Patent No.: US 10,837,478 B2
(45) Date of Patent: Nov. 17, 2020

(54) PTO COUPLER PROTECTOR

(71) Applicant: CK Industries, LLC, Fort Worth, TX (US)

(72) Inventor: J. C. Pace, III, Fort Worth, TX (US)

(73) Assignee: CK Industries, LLC, Fort Worth ( * ) Notice: Subject to any disclaimer, the term of this patent is extended or adjusted under 35 U.S.C. 154(b) by 0 days.

(21) Appl. No.: 16/823,548

(22) Filed: Mar. 19, 2020

(65) Prior Publication Data

US 2020/0300281 A1    Sep. 24, 2020

Related U.S. Application Data

(60) Provisional application No. 62/820,494, filed on Mar. 19, 2019.

(51) Int. Cl.
*A01B 71/08* (2006.01)
*A01B 71/06* (2006.01)
*F16B 7/04* (2006.01)

(52) U.S. Cl.
CPC .................................. *F16B 7/0426* (2013.01)

(58) Field of Classification Search
CPC ............. Y10T 403/592; Y10T 403/604; Y10T 403/7033; F16B 21/165; F16D 1/10;
(Continued)

(56) References Cited

U.S. PATENT DOCUMENTS 1,973,702 A * 9/1934 Cooke ....................... F16D 3/06
464/16
3,242,695 A * 3/1966 Ross, Jr. .................. F16D 3/06
464/16
(Continued)

FOREIGN PATENT DOCUMENTS

| CN | 106678343 A | 5/2017 |
| JP | 2000272365 A | 10/2000 |
| JP | 2001263024 A | 9/2001 |

OTHER PUBLICATIONS

Filing receipt and specification for provisional patent application entitled "PTO Coupler Protector," by J.C. Pace, III, filed Mar. 19, 2019 as U.S. Appl. No. 62/820,494.
Foreign communication from a related counterpart application—International Search Report and Written Opinion, PCT/US2020/023508, dated Jul. 8, 2020, 8 pages.

*Primary Examiner* — Michael P Ferguson
(74) *Attorney, Agent, or Firm* — Brett Pinkus

(57) ABSTRACT

A protector for a coupler for connecting a drive shaft of an implement to a tractor power take-off (PTO) comprises an elongated shaft having a proximal end and a distal end. The shaft may include a plurality of splines formed around a circumference of the shaft which extend longitudinally along the shaft from the distal end toward the proximal end. The splines may be arranged for meshing engagement with internal splines within a bore of the coupler. A grease zerk fitting may be disposed at the proximal end of the shaft through which grease can be extruded. A channel may extend through the shaft from the proximal end toward the distal end that is in fluid communication with the grease zerk fitting. A plurality of exit ports may be disposed around the circumference of the shaft at one or more positions along the length of the shaft, which are in fluid communication with the channel. Grease may be extruded into the protector through the grease zerk fitting, through the channel, and out through the exit ports to the exterior of the device.

5 Claims, 4 Drawing Sheets

(58) Field of Classification Search
CPC ... F16D 2001/103; A01B 71/06; A01B 71/08; A01B 71/00
See application file for complete search history.

(56) References Cited

U.S. PATENT DOCUMENTS

| | | | | |
|---|---|---|---|---|
| 3,386,312 | A * | 6/1968 | Weasler | B60K 17/28 |
| | | | | 74/609 |
| 4,318,630 | A * | 3/1982 | Herchenbach | A01B 71/06 |
| | | | | 285/316 |
| 4,425,817 | A | 1/1984 | Wells et al. | |
| 4,523,871 | A * | 6/1985 | Recker | F16D 1/116 |
| | | | | 403/12 |
| 4,819,755 | A * | 4/1989 | Smemo | F16C 3/03 |
| | | | | 180/235 |
| 4,873,882 | A * | 10/1989 | Goscenski, Jr. | F16D 1/06 |
| | | | | 74/411 |
| 4,960,344 | A * | 10/1990 | Geisthoff | F16D 1/116 |
| | | | | 172/125 |
| 5,522,669 | A * | 6/1996 | Recker | F16B 21/165 |
| | | | | 403/325 |
| 5,772,520 | A * | 6/1998 | Nicholas | F16C 3/03 |
| | | | | 137/580 |
| 6,102,804 | A * | 8/2000 | Kretschmer | F16C 3/03 |
| | | | | 464/7 |
| 8,100,601 | B2 * | 1/2012 | Pietsch | A01F 29/10 |
| | | | | 241/35 |
| 2009/0293652 | A1 | 12/2009 | Williamson | |

* cited by examiner

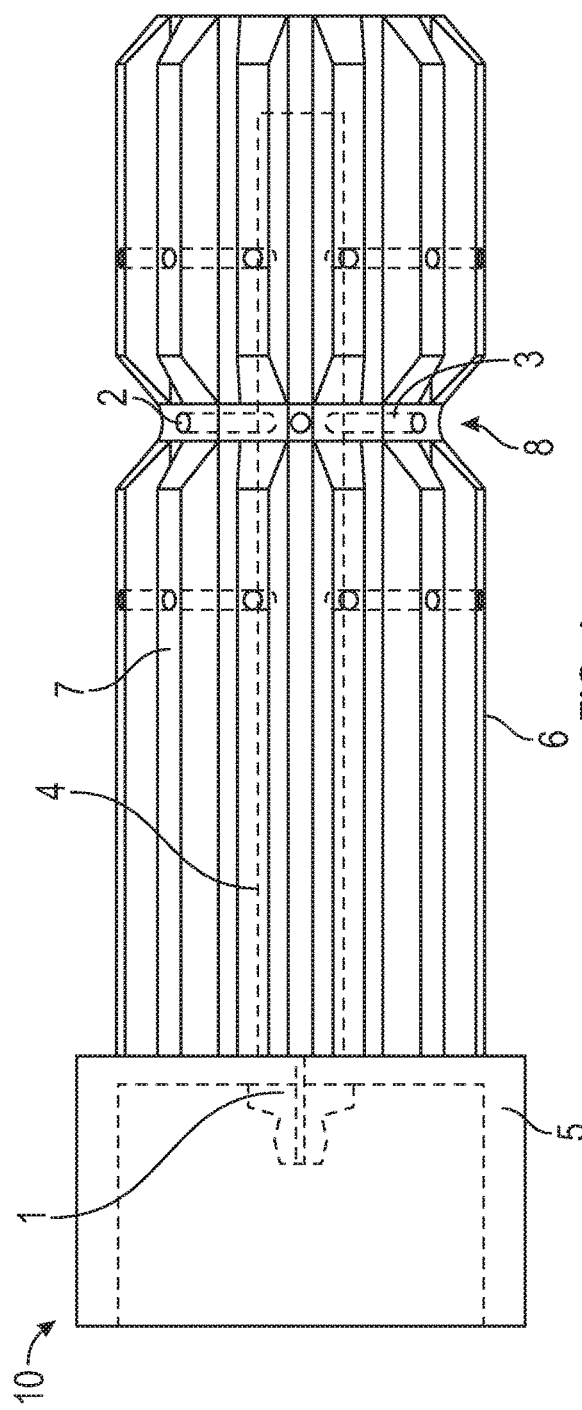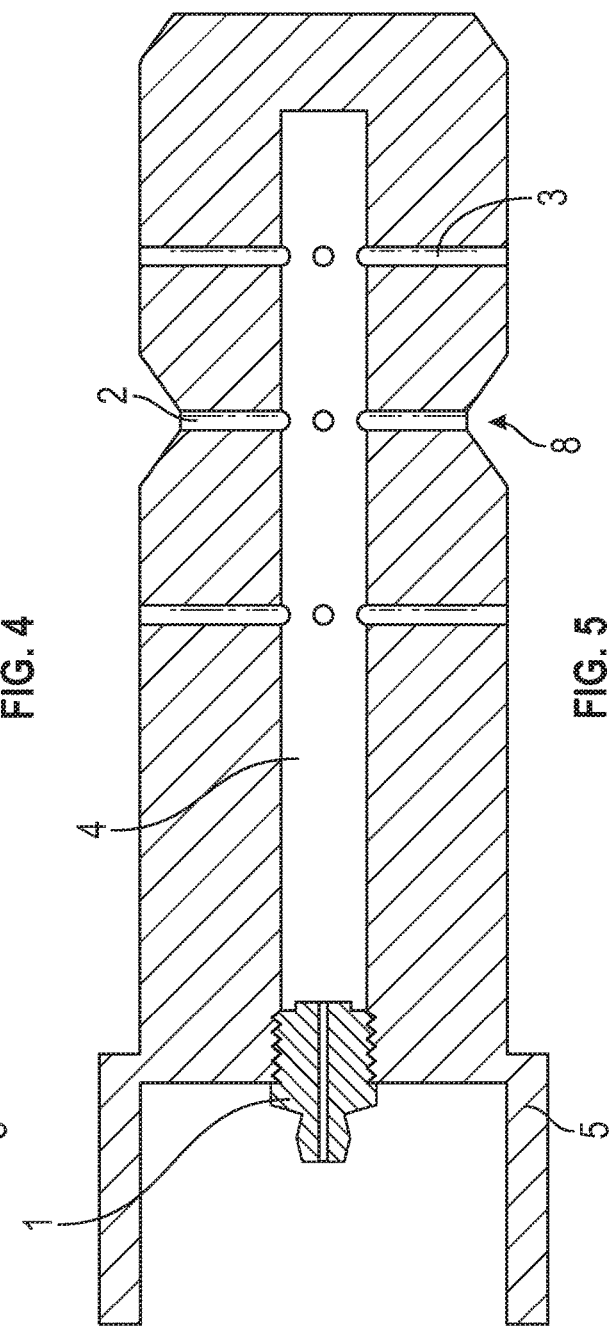

PTO COUPLER PROTECTOR

CROSS-REFERENCE TO RELATED APPLICATIONS

This application is a non-provisional application claiming priority from U.S. Provisional Patent Application No. 62/820,494 filed on Mar. 19, 2019, which is incorporated by reference herein.

FIELD

The present disclosure generally relates to a power take-off (PTO) driveshaft of motors, engines and tractors. More specifically, this disclosure relates to coupling devices that are meant to be attached to the power take-off (PTO) driveshaft of motors, engines and tractors.

BACKGROUND

An agricultural tractor may be coupled to a separate pulled implement or attachment, such as a rotary mower, spreader, hay baler, forage chopper, auger, snow blower, backhoe, or the like. The tractor may include a power take-off (PTO) shaft, which is a splined output shaft that can be coupled to the drive shaft of an implement to transfer rotational power from the engine of the tractor to the implement. The splined PTO shafts are designed to have a tight fit with the coupling device that is used to connect the drive shaft of implement to the PTO. The coupling device frequently becomes corroded, rusted or debris filled while not in use. Often times, it is nearly impossible to attach the coupling device to the PTO, as even a small amount corrosion, rust or debris can stop the shafts from sliding together. Further, it necessary to lubricate the entire the inside of the coupling device with grease to permit the tight fitting shafts to slide together, and it is often difficult to get the grease on and between the surfaces of the splines on the inside of the connecting device. Disclosed is a device that is inserted into the coupler device when it is not in service to remedy these issues.

SUMMARY

In an embodiment, a protector for a coupler for connecting a drive shaft of an implement to a tractor power take-off (PTO) comprises an elongated shaft having a proximal end and a distal end. The shaft may include a plurality of splines formed around a circumference of the shaft which extend longitudinally along the shaft from the distal end toward the proximal end. The splines may be arranged for meshing engagement with internal splines within a bore of the coupler. A grease zerk fitting may be disposed at the proximal end of the shaft through which grease can be extruded. A channel may extend through the shaft from the proximal end toward the distal end that is in fluid communication with the grease zerk fitting. A plurality of exit ports may be disposed around the circumference of the shaft at one or more positions along the length of the shaft. The exit ports may be disposed on the outer surface of the splines or on the surface of the shaft within the grooves that are formed longitudinally between the splines. The exit ports are in fluid communication with the channel through which grease is extruded to the exterior of the device and within the bore of the coupler.

In an embodiment, a recess may be formed transversely in the splines along the circumference of the shaft for receiving a connection means of the coupler. At least one exit port may be disposed in the recess through which the grease may be extruded to the exterior of the device. Further, at least one exit port may be disposed proximally of the recess and one exit port may be disposed distally of the recess. The exit ports may be located at various positions to more evenly disperse the grease around the device and within the coupler. Further, channels may be formed in the splines to more evenly disperse the grease around the device and within the coupler.

In an embodiment, a protective collar may be disposed at the proximal end of the shaft around the grease zerk fitting. The protective collar may have a diameter greater than a diameter of the proximal end of the shaft.

In an embodiment, a head may be disposed at the proximal end of the shaft. The head may have a diameter greater than a diameter of the proximal end of the shaft. The grease zerk fitting may disposed at the proximal end of the head, and wherein the channel extends from the head to the exit ports through the shaft.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a perspective view of a PTO coupler protector device according to another embodiment.

FIG. 5 is a cross-sectional view of the embodiment of FIG. 1.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The coupler protector device is intended to protect a PTO coupler from becoming difficult to attach to PTO shaft of a machine, such as a tractor or other motor or engine. When PTO coupler is not attached to the PTO and is not in use, the coupler protector device is inserted within the PTO coupler to protect it from corrosion, rust, and debris.

As used herein for reference, the distal end of the coupler protector device is the insertion end that is to be inserted into the PTO coupler, and the proximal end of the coupler protector device that is to remain protruding out of the PTO coupler.

Figure 1:
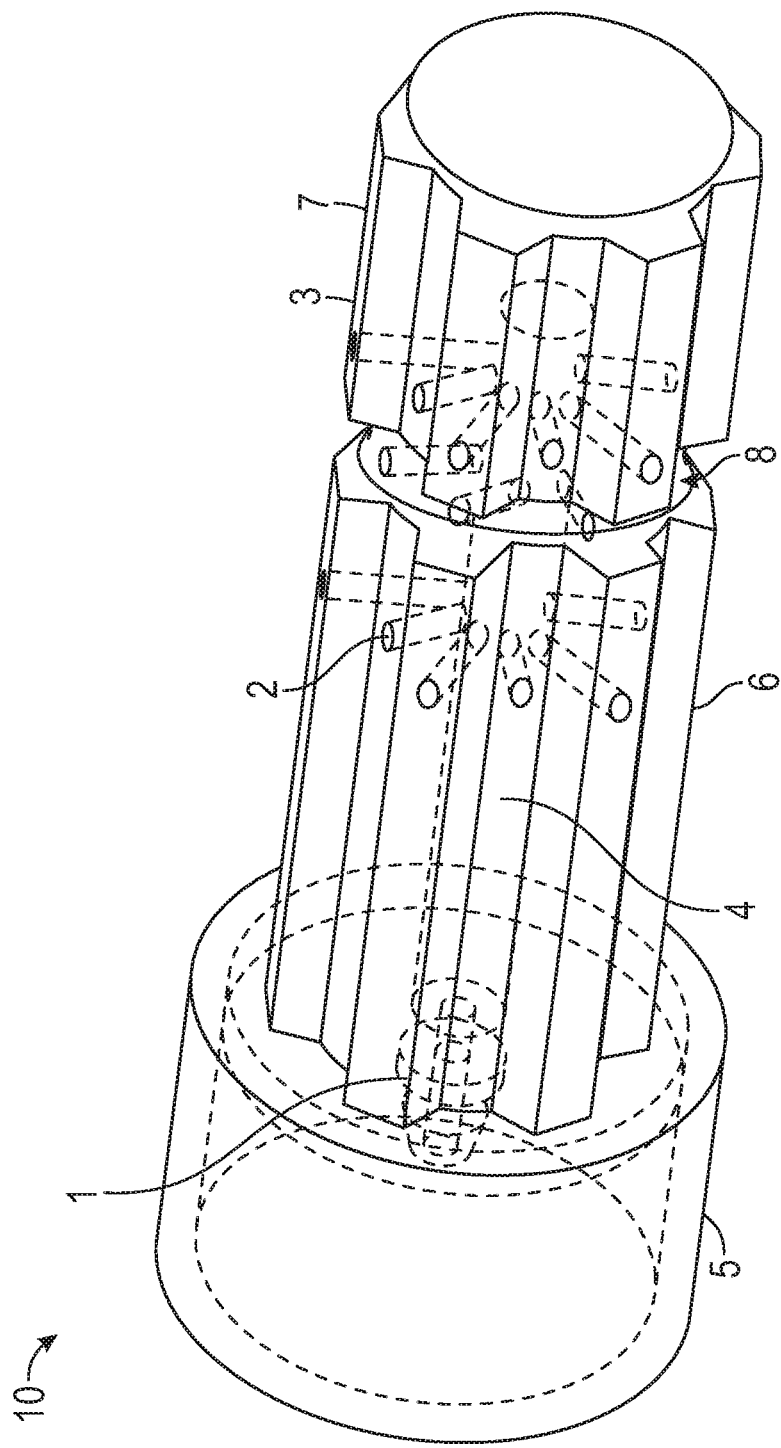
FIG. 1 is a perspective view of a PTO coupler protector device according to one embodiment.
Figure 6:
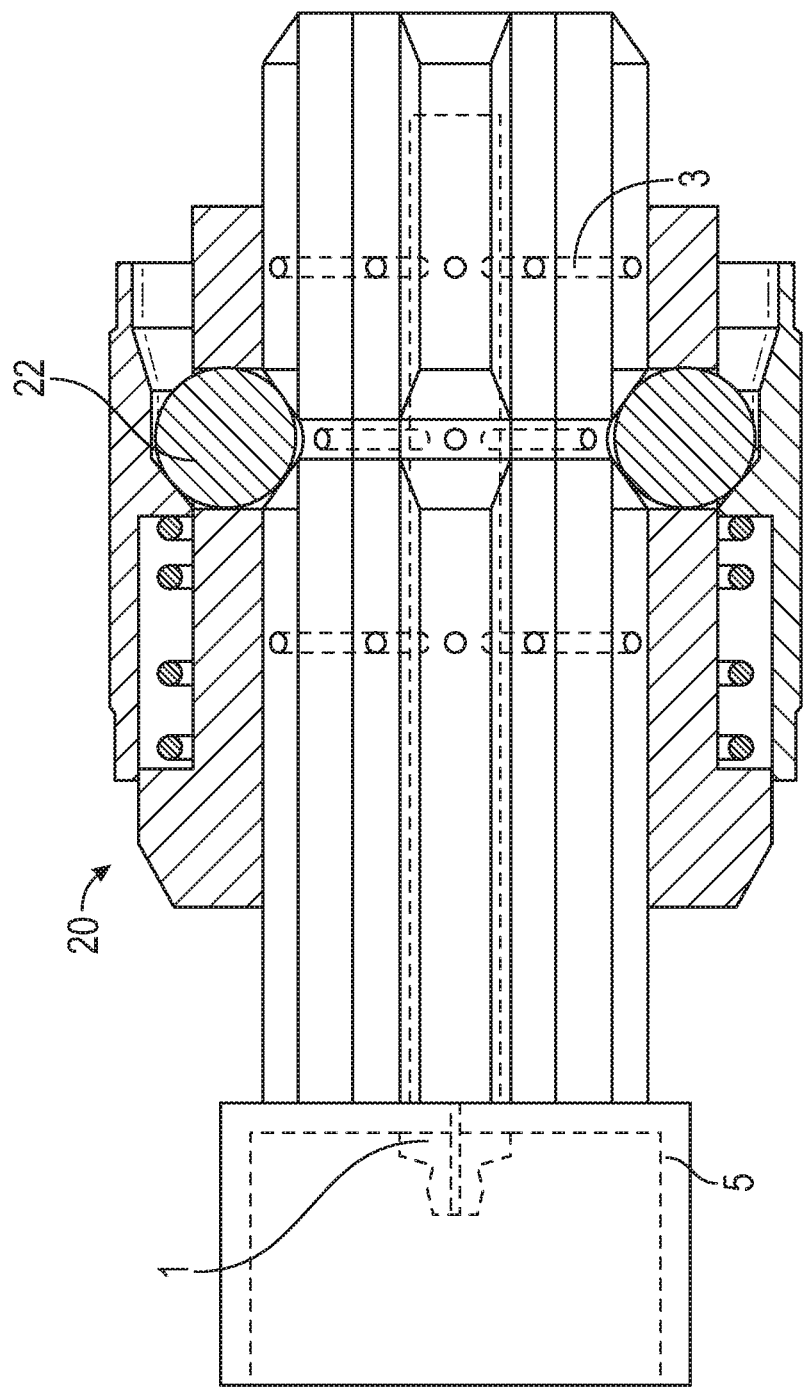
FIG. 6 is a side view of the embodiment depicted in FIG. 1 that has been securely inserted within a PTO coupler.

According to an embodiment shown in FIG. 1, the coupler protector device 10 includes a shaft 6 that is sized and shaped to fit within a bore of a PTO coupler 20, such as shown in FIG. 6. The shaft 6 may be comprised of a metal, composite, or polymer material. The material may be corrosion resistant, or the shaft may be coated with a material that is corrosion resistant. The shaft 6 may include splines 7 that are arranged in a pattern to fit within the corresponding grooves in the bore of the PTO coupler 20 into which the device is inserted. A recess 8 may be disposed transversely through the splines 7 around the circumference of the shaft 6 in which a connection means 22 (e.g., ball bearings) of the PTO coupler 20 may be secured to fix the device 10 in place.

Figure 2:
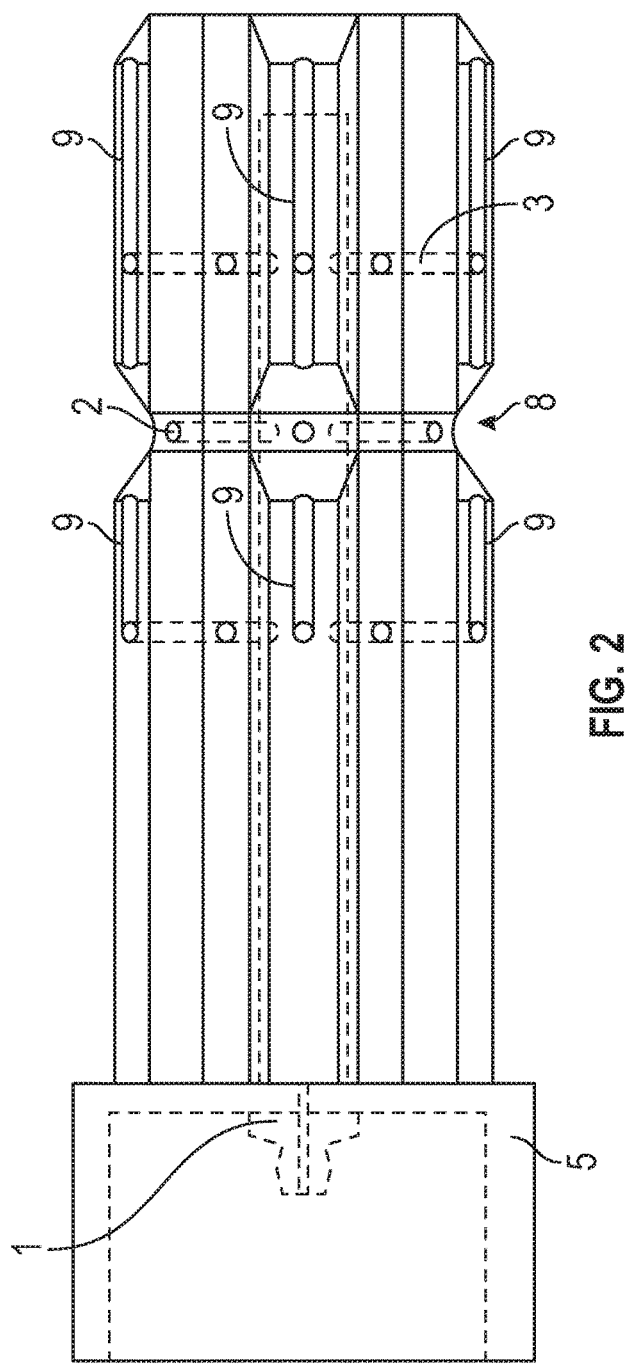
FIG. 2 is a side view of the embodiment depicted in FIG. 1.
Figure 3:
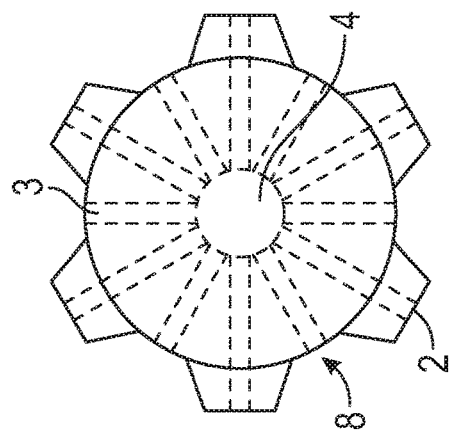
FIG. 3 is rear view of proximal end of the embodiment depicted in FIG. 1.

This device 10 is intended to be used with various standards for the types of PTO's and couplers used in the United States and other countries, and as such the pattern and number of the splines 7 and the shape and diameter of the shaft 6 can vary accordingly. For example, FIGS. 1-3 depict an embodiment of the device 10 that would fit within a PTO coupler for a 540 RPM PTO which includes six splines 7. FIG. 4 depicts another embodiment of the device 10 that would fit within a PTO coupler for a 1000 RPM PTO which may include twenty splines 7 (as shown) or twenty-one splines (not shown). Agricultural PTOs are standardized in dimensions and speed according to ASABE/ISO 500, which is promulgated by the American Society of Agricultural and Biological Engineers and the International Organization for Standardization, which is incorporated herein by reference. There are also other variations in the style and dimensions of the PTO, such as North American, European (German and Italian), and Large Industrial.

In one embodiment, the shaft 6 of device 10 may include a center channel 4 that extends from the proximal toward the distal end of the shaft. The center channel 4 may be a channel, bore, tube, or cavity that provides a passageway for grease to be extruded through the shaft 6. The center channel 4 may extend to the location of the most distally located port 2 or to the distal end of the shaft 6.

A grease zerk fitting 1 may be disposed at the proximal end of the shaft 6. The grease zerk fitting 1 may be comprised of a metal, thermoplastic, or the like. By way of example, the grease zerk fitting 1 may have a threaded connection, drive connection (e.g., barbed, Christmas-tree, serrated shank), or smooth press fit connection (e.g., smooth shank) for securing the grease zerk fitting 1 at least partially within the center channel 4 of the shaft 6, or the grease zerk fitting 1 may be adhered, soldered, or welded in place. The grease zerk fitting 1 may also be molded in place if made of a thermoplastic. There may be a plurality of ports 2 located at one more positions along the length of the shaft 6 to allow grease to exit from the center channel 4 to the exterior of the device 10. For example, the ports 2 may be round shaped holes as shown, or may be rectangular slots or any other desired shape. Smaller channels or tubes 3 may be used to provide a passageway to connect the center channel 4 to the ports 2.

The grease zerk fitting 1 provides for an attachment to a grease gun for injecting grease into the device 10. The grease passes through a channel within the grease zerk fitting 1 into the center channel 4 of the shaft 6 of the device 10. The grease will travel down the shaft 6 through the center channel 4, and then out through the small channels 3 to exit out of the ports 2. After exiting the ports 2, the grease will spread around surface of the device 10 and fill the area inside the bore of the PTO coupler 20 within which the device 10 is inserted.

The ports 2 may be disposed at locations that correspond to the interior of the PTO coupler 20 to which the device is to be inserted. The ports 2 are preferably located to disperse the grease as uniformly as possible on the exterior of the device 10 and within the bore of the PTO coupler 20. For example, the ports 2 may be located on an outer circumferential surface of the splines 7 or on the surface of the shaft 6 in the grooves located in between the splines 7. The embodiments shown depict the ports 2 being disposed uniformly in at least three circumferential locations along the shaft 6—a first location proximal of the recess 8, a second location within the recess 8, and a third location distal of the recess 8. The ports 2 located within the recess 8 may apply grease to the connection means 22 of the PTO coupler 20. In other embodiments, the locations of one or more of the ports 2 may be varied proximally or distally. There may also be one or more ports 2 located at the distal end of the shaft 6.

The shaft 6 may include a groove 9 formed on one or more of the splines 7 that serve as channels to provide for additional dispersion of the grease. In an embodiment such as shown in FIG. 2, the grooves 9 may extend from the ports 2 and be aligned in parallel along the outer surface of the splines 7. In another embodiment, the grooves 9 may be aligned transversely along the circumference of the shaft 6, and may be disposed at different locations along the length of the shaft 6 to disperse the grease. In a further another embodiment, the grooves 9 may be aligned diagonally, or may form a cross-hatched pattern. In yet another embodiment, the grooves 9 may be formed in a spiral along the length of the shaft 6. It is also contemplated that the grooves 9 may be formed in combinations of these patterns or in other desired patterns which are not specifically disclosed herein.

The shaft 6 may include a protective collar 5 for the grease zerk fitting 1 disposed around proximal end of the shaft 6. In another embodiment, the shaft 6 may be formed with a head at its proximal end having an expanded diameter, and the grease zerk fitting 1 being disposed at the proximal end of the head. The collar 5 or head may provide an expanded diameter to allow for easier insertion or removal of the device 10 from the PTO coupler 20, as well as ensuring that the device 10 does not become inserted too far into the PTO coupler 20.

In another embodiment, there may a plurality of channels 4 that extend from the from the proximal toward the distal end of the shaft 6. The plurality of channels 4 may each be connected to a single grease zerk fitting 1 or to separate grease zerk fittings. The plurality of channels 4 may extend to the location of the most distally located port 2 to which it is connected or to the distal end of the shaft 6. The lengths of the plurality of channels 4 may be uniform or varied.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Additionally, other items shown or discussed as directly coupled with each other may be indirectly coupled or communicating through some interface, device, or intermediate component, whether mechanically or otherwise. Other examples of changes, substitutions, and alterations are ascertainable by one skilled in the art and could be made without departing from the spirit and scope disclosed herein.

What is claimed is:

1. A protector received within a coupler configured for connecting to a tractor power take-off (PTO) driveshaft, the protector comprising:
    an elongated shaft having a proximal end and a distal end, the shat including a head disposed at and protruding from the proximal end, a plurality of splines formed around a circumference of the shaft and which extend longitudinally along the shaft from the distal end toward the proximal end and are arranged for meshing engagement with internal splines within a bore of the coupler, and an annular recess formed in the splines along the circumference of the shaft for receiving a connection means of the coupler, wherein the distal end is inserted within the bore of the coupler to lubricate and protect the internal splines and the connection means of the coupler when not in use with the PTO driveshaft;
    a grease zerk fitting disposed within the head at the proximal end of the shaft through which grease is extruded;
    a channel axially extending through the shaft from the proximal end toward the distal end that is in fluid communication with the grease zerk fitting; and
    a plurality of radially-extending exit ports disposed around the circumference of the shaft along the length of the shaft that are in fluid communication with the channel through which grease is extruded into the bore of the coupler for lubricating the splines of the coupler, wherein at least one exit port is disposed in the recess for applying grease to the connection means, and at least one exit port is disposed within the splines of the shaft proximal or distal to the recess.

2. The protector of claim 1, wherein at least one exit port is disposed proximally of the recess and at least one exit port is disposed distally of the recess.

3. The protector of claim 1, wherein at least one exit port is disposed at the distal end of the shaft.

4. The protector of claim 1, wherein the head comprises a protective collar disposed at the proximal end of the shaft around the grease zerk fitting, the protective collar having a diameter greater than a diameter of the proximal end of the shaft.

5. The protector of claim 1, wherein the head has a diameter greater than a diameter of the proximal end of the shaft.

* * * * *